United States Patent

[11] 3,577,713

| [72] | Inventors | Horace G. McCarty;<br>Henry N. Lausch; Earl A. Hudson, Leola, Pa. |
|------|-----------|---|
| [21] | Appl. No. | 748,021 |
| [22] | Filed | July 26, 1968 |
| [45] | Patented | May 4, 1971 |
| [73] | Assignee | Sperry Rand Corporation<br>New Holland, Pa. |

[54] HEADER LOCK MEANS FOR AGRICULTURAL HARVESTING MACHINES
9 Claims, 6 Drawing Figs.

[52] U.S. Cl.................................................. 56/11.9, 172/466
[51] Int. Cl........................................................ A01d 43/10
[50] Field of Search........................................... 56/23, 2, 228, 218, (DIG. 9); 172/466

[56] References Cited
UNITED STATES PATENTS

| 2,593,176 | 4/1952 | Patterson........................ | 172/466 |
| 2,952,472 | 9/1960 | McNeill............................ | 172/466 |
| 3,021,908 | 2/1962 | Dlugosch......................... | 172/466 |
| 3,397,520 | 8/1968 | Johnston et al................. | 56/23 |

*Primary Examiner*—Antonio F. Guida
*Attorneys*—Joseph A. Brown and John E. Becker ABSTRACT: This invention relates to a header locking means for agricultural harvesting machines having a mobile main frame, and a subframe and harvesting header mounted on the main frame. The subframe and header are mounted as a unit for pivotal movement relative to the main frame about a predetermined transverse axis between a lowered operating position and a fully raised nonoperating, transport or servicing position. Novel safety mechanical locking means in the form of a telescopic link assembly are provided to lock the header unit in a fully raised or intermediate position for various reasons including safety in transport or servicing of the header unit.

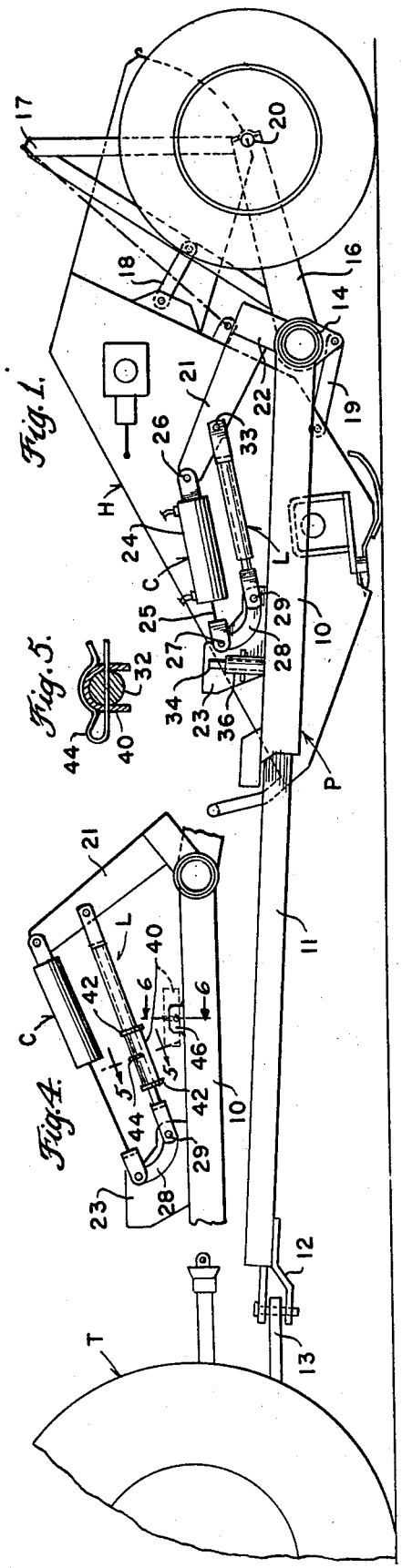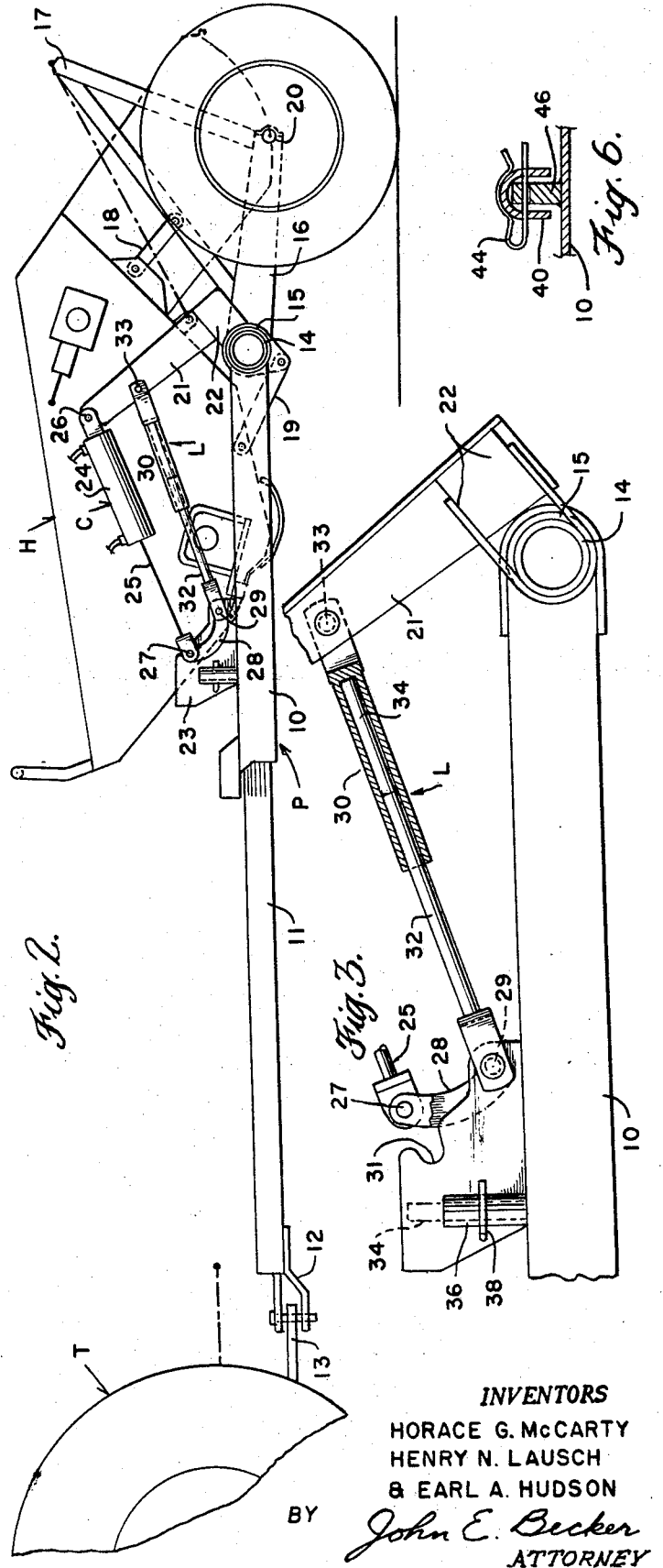

HEADER LOCK MEANS FOR AGRICULTURAL HARVESTING MACHINES

BACKGROUND OF THE INVENTION

This invention relates to improvements in agricultural harvesting machines and more particularly to machines commonly referred to as a mower-conditioner-windrower type developed in recent years. Some machines of this general type comprise an L-shaped main frame having one leg extending in a fore-and-aft direction and a second leg journaled upon and extending transversely to said one leg, and upon which is supported a subframe and header unit for pivotal mounting with respect to the main frame about a predetermined lateral axis. The header unit is vertically adjustable to accommodate varying heights of crop material and therefore is movable between a predetermined lowered operative harvesting position and a fully raised, or predetermined intermediate road transport or servicing position. The header subframe unit is usually pivotally and resiliently supported upon the main frame by a suitable suspension system, and embodies lifting means preferably comprising hydraulic cylinder means interposed between a fixed bracket on the main frame and a rotatable lift arm attached to a pivotal part of the main frame.

The header unit is selectively raisable from a lower to an upper position, both on the pull-type and self-propelled vehicles. Therefore, the subject locking means to hold the header in its fully raised condition may be applicable to both of the aforesaid machines, as well as to others requiring similar holding means. Irrespective of the types of machine involved, it has been found preferable, and sometimes may be necessary, to retain the header in its fully raised condition, as during road transport or in order to service various of the components.

With respect to the illustrated trail-type vehicle, which derives hydraulic lifting power from a source on the draft vehicle, it may be desirable or necessary to work on said machines without having the draft vehicle and attendant fluid pressure system available to retain the header in its fully raised position. The subject telescopic link, locking means has been evolved as a safety means to retain the header in a fully raised or intermediate position.

SUMMARY OF THE INVENTION

This invention is directed to a mechanical safety link assembly comprising a pair of telescopic link members, one of which has its free end attached to a bracket on the fore-and-aft directed leg of the main frame of the machine and the other link having its free end attached to a generally fore-and-aft but radially extended lifting arm or bellcrank attached to the transverse leg of the main frame.

The link assembly is removably pinned at its opposite ends in an adjustable manner to the lift arm and bracket attached to the main frame, and has removable locking means interposed in cooperation therewith. The locking means interposed with the telescopic links may comprise a removable rigid slug insertable within the female portion of the link. It also may be in the form of a channel-shaped insert of rigid material which is removably applied to the shank of the male link intermediate the pivot of the male link and the female portion thereof. Either of said locking means serve to preclude telescopic collapse of the link assembly and thereby assures a positive retention of the header H in its raised, nonoperating condition.

Accordingly, it is a primary object of this invention to provide improved mechanical safety means embodied with machines of the aforedescribed character for retaining the pivotally mounted subframe on the header unit in a raised condition relative to the ground and to the main frame of the unit.

Another object of this invention is to provide a mechanical locking device comprising a pair of frame-attached, telescopic link members and means interposable therewith to selectively lock the telescopic link assembly in an extended condition.

Still another object of the invention is to provide a positive mechanical locking device of the aforesaid character which will facilitate installation and operation at relatively low cost.

These and other objects and advantages will become more apparent from the following detailed description taken in conjunction with the illustrative drawings.

DESCRIPTION OF THE DRAWINGS

FIG. 1 is the semidiagrammatic side elevational view of a mower-conditioner type harvesting device of the pull type, shown in conjunction with a fragmentary portion of a draft vehicle, and shown with the header thereof in its lower operating position;

FIG. 2 is a view similar to that of FIG. 1 but showing the header in its fully raised or transport position and with the link locking means in effect;

FIG. 3 is an enlarged fragmentary side elevational view with certain parts of the link assembly shown in cross section to better show the detail and operation thereof;

FIG. 4 is a fragmentary, side elevational view similar to FIG. 2 but of an alternate form of link assembly;

FIG. 5 is an enlarged transverse cross-sectional view of the alternate form shown in FIG. 4, as viewed substantially on line 5–5 of FIG. 4; and FIG. 6 is an enlarged transverse cross-sectional view as would be seen when the link is stored on the bracket, as viewed on line 6–6 of FIG. 4.

DESCRIPTION OF THE PREFERRED EMBODIMENTS

Referring now to the drawings, which are for illustrative purposes only, there is depicted a pull-type harvesting machine of the mower-conditioner-windrower type which comprises a generally L-shaped base or main frame designated P and has mounted thereon a unitized subframe and header designated generally at H. The machine is intended to be pulled by a conventional farm tractor generally designated T (shown fragmentarily). The header H is pivotally mounted on the main frame and is adjustable for different attitudes with respect to the main or base frame and to the ground by means of a piston and cylinder lifting means generally designated C. Power for driving the respective elements of the header is derived from a tractor PTO shaft and transmitted to appropriate drive means not fully shown because they constitute no part of the present invention. The link locking assembly is designated generally by L and is disposed generally in parallel relation beneath the lifting means C and is connected to the same relative components thereof to be described in more detail.

More specifically the pull-type unit P comprises an L-shaped main frame including a fore-and-aft directed first leg portion 10 having a forwardly extended pivoted drawbar 11 the latter of which is pivotally attached by yoke 12 thereon to a tractor-attached drawbar frame member 13. The main frame further includes a transversely extended second leg 14 on which the main frame first leg 10 is pivotally mounted by means of suitable sleeve bearings 15–15. Also constituting part of the main frame are a pair of laterally spaced wheel-carrying arms 16–16 which project rearwardly behind the tubular second leg 14 and are pivotally mounted thereon. The arms 16–16 serve as a bases of a pair of triangular shaped, rigidly connected, composite frame members terminating in an upper apex designated 17. It will be seen that the triangular framework and wheel-supporting means are pivotal about the second leg, illustrated by a comparison of FIGS. 1 and 2, and has the header H attached in part to the hypotenuse portions of the triangular frames and in part to the transverse leg 14, both by means of link members 18 and 19, respectively. When the frames are adjusted relative to each other responsive to header adjustment by the cylinder means C, the triangular frame members and the main frame 10 together pivot upwardly about the axis 20 of the ground supporting wheels.

The means for lifting the header from the harvesting position of FIG. 1 to the raised, road transport or servicing position of FIG. 2, and for affecting the attendant attitude change of the related frame members, includes the piston device C and a heavy-duty lift arm 21 disposed in the generally tangential manner to leg 14 by means of a weld bracket 22. A fixed, upright support bracket 23 is secured on a forward portion of the main frame 10 and in aligned spaced relation to the arm 21. The piston device C interposed between these lift and support brackets, comprises a conventional double-acting hydraulic cylinder 24 and a piston member 25, with the cylinder 24 being pivotally connected to the lifting arm 21 as by means of a pin 26, and with the piston member 25 connected by means of pin 27 in an operative manner to the bracket 23, via an intermediate split curved link or bellcrank lever 28 which preferably straddles bracket 23 and is pinned at 29 to the bracket 23. It is noted that connecting pin 27 resets or bears within notch 31 provided in bracket 23 thereby enabling hydraulic retraction, whether intended or inadvertent, of the double-acting cylinder means C after the locking means has been assembled, without imparting load damage to the related components. Where machines are provided with a single-acting cylinder permanently mounted on the unit, the curved link may not be needed. When attaching the cylinder to the unit, this curved link also enables it to be raised or lowered about pivot 27 to aid in aligning the mounting holes of the link and cylinder.

In spaced relation beneath the cylinder assembly C, the telescopic link assembly L is disposed generally parallel to assembly C and comprises an outer cylinder or female link 30 and an inner telescoping male link 32, the nontelescoping ends of the respective links being pivotally connected to the arm 21 and bracket 23, respectively, by suitable pivot pins 33 and 29. The link assembly utilizes a removable locking means in association therewith at predetermined times to preclude the collapse of the link assembly. The removable locking means may have the form of a cylindrical slug designated at 34 which is generally of the same diameter as piston 32 and is removably insertable within cylinder 30. To insert the slug 34, better seen in FIG. 3, preferably the pinned end 33 of the cylinder 30 of the link assembly is briefly removed from its mounting to enable the disassembly thereof by lowering about pivot pin 29 of the piston link 32, to allow for the insertion of a slug therein whereupon the respective links are reassembled with the slug trapped therein. It is apparent now that the lifting arm 21 precludes lowering of the raised header when the hydraulic cylinder means C is disconnected or removed for any purpose.

When the slug 34 is not in use it is stored in a sleeve 36 attached in an upright manner to the bracket 23. If desired the slug and storage sleeve bracket may be complementally apertured to removably receive a storage retention pin 38.

ALTERNATE EMBODIMENT

An alternative form of locking means is shown in FIGS. 4, 5, and 6 comprises a locking member of predetermined length of generally channel formation having a generally C-shaped cross section as seen in FIG. 5. The length of the slug or locking member 40, the same as with respect to slug 34 can be determined by the general throw of the cylinder means C, preferably being slightly shorter than the overall length of travel of C. A pair of spaced bearing washers 42–42 preferably are rigidly attached to the respective piston and cylinder as shown in FIG. 4. The washers must be spaced so that they do not preclude the cylinder assembly from being fully retracted, preferably there being approximately a one-fourth of an inch clearance between said washers when in the fully retracted position. With the utilization of said washers 42, it is apparent that the channel slug 40 is merely inserted therebetween and over the shank of piston link 32. The slug 40 and also the link 32 are complementally apertured (FIGS. 5 and 6) to facilitate receiving of a suitable retaining pin 44 which is snapped therein to preclude inadvertent or premature removal of the member 40. The locking member 42 is removably stored upon the main frame 10 by being pinned to upright plate bracket 46 (FIG. 5).

From the foregoing detailed description taken in conjunction with the illustrative drawing FIGS., it is apparent that a novel and useful locking means for association with the header unit has been evolved which achieves all the objects and advantages set forth in the preamble and throughout the specification. Further, it is apparent that various intermediate length slug members may be utilized to temporarily lock the header at various predetermined settings, such as setting it slightly higher than the normally lowered position when operating in relatively deep corrugated irrigation fields.

Prior to this invention, it was necessary to have a tractor or other fluid pressure operating source present to maintain a constant load on the hydraulic or pneumatic cylinder. The instant invention thereby overcomes this further disadvantage.

While this invention has been described in connection with particular embodiments, it will be understood that it is capable of a variety of modifications and that this application is intended to cover such variations, uses or adaptations following, in general, the principle of the invention and including such departures from the present disclosure as come within known or customary practice to one skilled in the art to which the invention pertains, and as fall within the scope of the invention or the limits of the appended claims.

We claim:

1. An agricultural harvesting machine comprising in combination:
    a mobile main frame having a longitudinal frame member disposed in a fore-and-aft travel direction;
    a crop-harvesting header unit resiliently mounted on said main frame for pivotal movement relative to the main frame about a predetermined transverse axis;
    header lifting means on said main frame for pivotally moving the header unit between a lowered, harvesting position and a raised transport or service position;
    a hydraulic lift cylinder;
    means pivotally attaching said hydraulic lift cylinder to said frame member and said header lift means for lifting and lowering said header; and
    mechanical locking means to temporarily lock the header unit in a predetermined raised position comprising a link assembly extending in the same direction as said hydraulic lift cylinder and in side-by-side relation therewith and having a relatively rigid tubular sleeve and an elongated rod telescoping in said sleeve, said sleeve and rod being relatively slideable interposed between the longitudinal frame member and the lifting means, said rod and sleeve having anchored ends, said anchored ends being attached, respectively, to said frame member and lifting means in the raised and lowered positions, and holding means interengageable with the sleeve and said rod adjacent the anchored end for maintaining the header and the link assembly in a predetermined raised position.

2. A machine as defined in claim 1 wherein:
    said elongated tubular sleeve has one open end and one closed end, the open end thereof having first abutment means thereon;
    said elongated rod has a second abutment means rigidly affixed to the elongated rod adjacent the anchored end thereof at a predetermined distance therefrom; and
    the respective abutment means being nonengageable with each other when the header unit is moved to its fully lowered condition.

3. A machine as defined in claim 2, wherein the holding means interengageable with the link assembly to maintain it in predetermined raised position includes bracket means embraceable with the elongated rod and removably interposed between the respective abutment means.

4. A machine as defined in claim 3, wherein the elongated rod and bracket means are complementally apertured and have locking pin means removably engageable with the apertures thereof.

5. A machine as defined in claim 3, wherein the bracket means is of various predetermined lengths.

6. A machine as defined in claim 3, further including bracket retaining means affixed to the main frame and means to removable attach the bracket thereto for storage purposes when not needed.

7. A machine as defined in claim 1, wherein:
said tubular sleeve has one open end and one closed end;
said elongated rod has said anchored end connected to a portion of the frame member; and
said holding means includes a rigid slug member of predetermined length and removably insertable within the tubular sleeve and engageable at one end by the telescoping end of the rod therewithin and against the closed end of said tubular sleeve at the other end of the slug member.

8. A machine as defined in claim 7, further including slug storage bracket means on the frame member disposed in close association with the link assembly for storing the slug member when not needed.

9. A machine as defined in claim 7, wherein the slug members are of various predetermined lengths.